(12) United States Patent
Hashimoto

(10) Patent No.: US 6,335,909 B1
(45) Date of Patent: Jan. 1, 2002

(54) MULTI-LAYER RECORDING MEDIUM REPRODUCING DEVICE

(75) Inventor: Chiaki Hashimoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/237,376

(22) Filed: Jan. 26, 1999

(30) Foreign Application Priority Data

Jan. 27, 1998 (JP) .......................................... 10-014316

(51) Int. Cl.[7] ................................................ G11B 7/09
(52) U.S. Cl. ............................. 369/44.29; 369/44.27; 369/44.35; 369/94
(58) Field of Search ................................ 369/44.27, 94, 369/44.25, 44.29, 44.35, 58, 54, 44.36

(56) References Cited

U.S. PATENT DOCUMENTS

| | | | |
|---|---|---|---|
| 5,808,983 A | * | 9/1998 | Tsutsui et al. ............ 369/44.29 |
| 5,859,824 A | * | 1/1999 | Izumi et al. .................. 369/58 |
| 6,011,762 A | * | 1/2000 | Watanabe et al. ......... 369/44.27 |
| 6,115,333 A | * | 9/2000 | Igarashi ....................... 369/94 |

FOREIGN PATENT DOCUMENTS

| | | |
|---|---|---|
| JP | 60-202545 | 10/1985 |
| JP | 60-202554 | 10/1985 |
| JP | 9-161284 | 6/1997 |

* cited by examiner

Primary Examiner—Thang V. Tran
(74) Attorney, Agent, or Firm—Morgan, Lewis & Bockius LLP

(57) ABSTRACT

A multi-layer recording medium reproducing device having an automatic adjustment mode of automatically performing servo adjustment to reproduce a multi-layer optical disk. The device includes a storing section which, during the automatic adjustment mode, performs the servo adjustment of recording layers of the optical disk respectively for predetermined periods of time, and stores the resultant service adjustment values respectively for the recording layers; and a servo adjustment control section which, during a reproduction of the optical disk, reads from the storing section a servo adjustment value corresponding to one of the recording layers to be reproduced, and performs the servo adjustment to reach the servo adjustment value thus read.

3 Claims, 2 Drawing Sheets

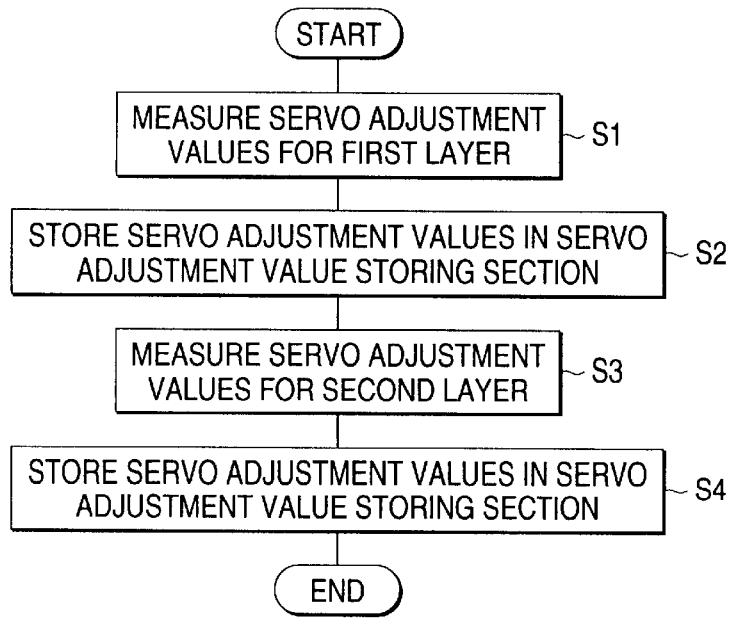
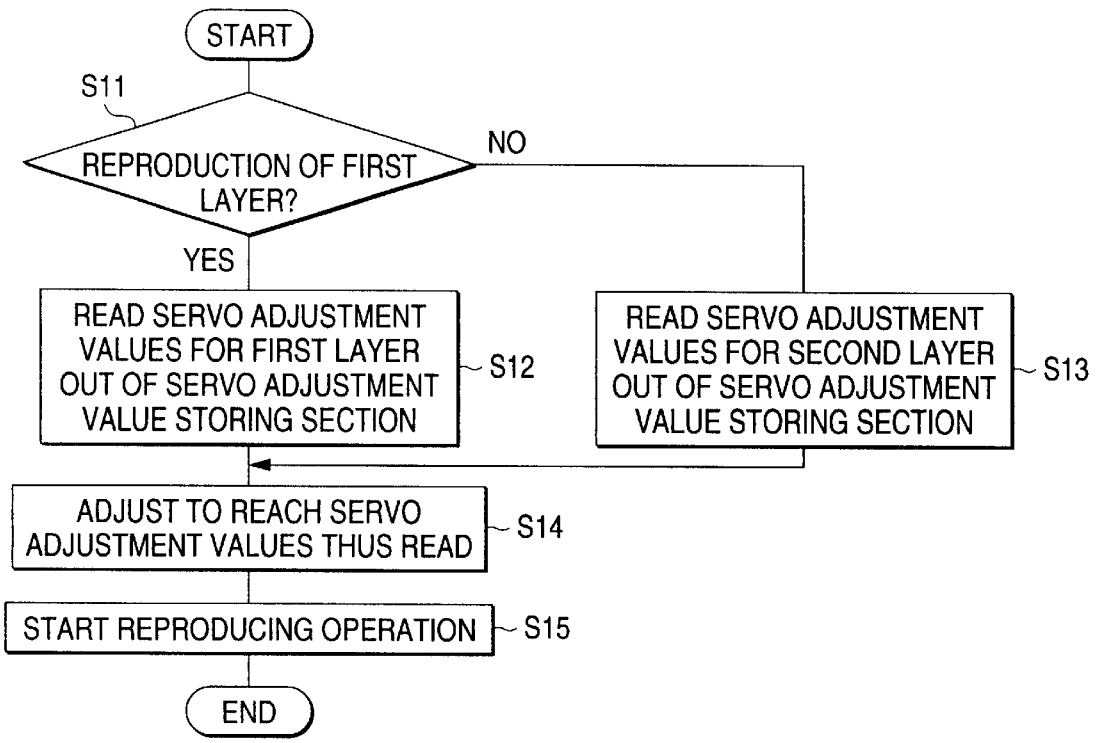

MULTI-LAYER RECORDING MEDIUM REPRODUCING DEVICE

BACKGROUND OF THE INVENTION

1. Field of the Invention

This invention relates to a multi-layer recording medium reproducing device adapted to reproduce, for instance, a multi-layer optical recording medium, and more particularly to a multi-layer recording medium reproducing device having an automatic adjustment mode of automatically carrying out servo adjustment (adjustment of focusing servo and tracking servo) to satisfactorily reproduce a multi-layer optical recording medium.

2. Description of the Related Art

An optical disk recording and reproducing device has been proposed in the art which uses an optical recording medium (hereinafter referred to as "an optical disk", when applicable) such as a digital video disk (DVD) to record or reproduce data.

The optical disk recording and reproducing device has an optical pick-up made up of a variety of optical components. The laser beam of the optical pick-up, while being converged on the pit surface of the optical disk, is moved radially outwardly on the optical disk, to read signals recorded on the optical disk.

In this case, in order that the focusing servo of converging the laser beam of the optical pick-up on the pit surface of the optical disk and the tracking servo of radially moving the optical pick-up along the recording track of the optical disk are carried out with high accuracy, it is necessary to adjust in advance the offset, gain and balance of the focusing servo and tracking servo.

The adjustment of the offset, gain and balance of the focusing servo and tracking servo (hereinafter referred to as "a servo adjustment", when applicable) is heretofore manually achieved. More specifically, an optical disk is loaded on the optical disk recording and reproducing device. While the optical disk is being reproduced for a predetermined period of time, for instance, the resistance values of pre-set resistors provided in the focusing servo circuit and in the tracking servo circuit are adjusted.

However, a recent optical disk recording and reproducing device has an automatic adjustment mode of automatically performing the focusing and tracking servo adjustment. That is, when the user loads an optical disk on the optical disk recording and reproducing device, and operates a reproducing button, immediately after the reproduction starts the automatic adjustment mode is carried out for a predetermined period of time (of the order of 5 to 10 sec) . That is, the servo adjustment is automatically performed. When the focusing servo and the tracking servo become satisfactory, the initial state is effected again, to actually start the reproduction of the optical disk.

On the other hand, recently an optical disk has been greatly increased in capacity. Accordingly, the structure of the optical disk has been changed from a single-layer structure to a multi-layer structure (mainly a double-layer structure).

In the multi-layer optical disk, different layers have different servo adjustment values. Therefore, whenever a recording layer to be reproduced is switched, it is necessary to perform the servo readjustment.

For instance when, with a multi-layer optical disk loaded on the optical disk recording and reproducing device, during the reproduction of the first layer (the front layer) the operator operates the button to switch, the first layer is switched over to the second layer (the layer under the first layer), at this time instant the optical disk recording and reproducing device performs the automatic adjustment mode, and, after the servo readjustment, starts the reproduction of the second layer.

That is, in the conventional optical disk recording and reproducing device, whenever the recording layer to be reproduced is switched (i.e., whenever the first layer is switched over to the second layer or the second layer is switched over to the first layer) the automatic adjustment mode must be performed for about five to ten seconds. Therefore, the switching of the recording layers is not smoothly achieved. During this period, nothing is reproduced (i.e., no sound is produced), and therefore the user is struck as incongruity and feels uncomfortable.

SUMMARY OF THE INVENTION

In view of the foregoing, an object of the invention is to provide a multi-layer recording medium reproducing device in which, even if the recording layer to be reproduced is switched during the reproduction of a multi-layer optical disk, the switching operation is achieved smoothly.

In order to achieve the above object, the invention provides a multi-layer recording medium reproducing device having an automatic adjustment mode of automatically performing servo adjustment to reproduce a multi-layer recording medium, the device comprising: a storing section which, during the automatic adjustment mode, performs the servo adjustment of recording layers of the multi-layer recording medium respectively for predetermined periods of time, and stores the resultant servo adjustment values respectively for the recording layers; and a servo adjustment control section which, during a reproduction of the multi-layer recording medium, reads from the storing section a servo adjustment value corresponding to one of the recording layers to be reproduced, and performs the servo adjustment to reach the servo adjustment value thus read.

BRIEF DESCRIPTION OF THE DRAWINGS

In the accompanying drawings:

FIG. 2 is a flow chart for a description of the operations of an automatic adjustment mode with a double-layer optical disk loaded; and FIG. 3 is a flow chart for a description of the reproduction operation of the double-layer optical disk.

DETAILED DESCRIPTION OF THE PREFERRED EMBODIMENT

Figure 1:
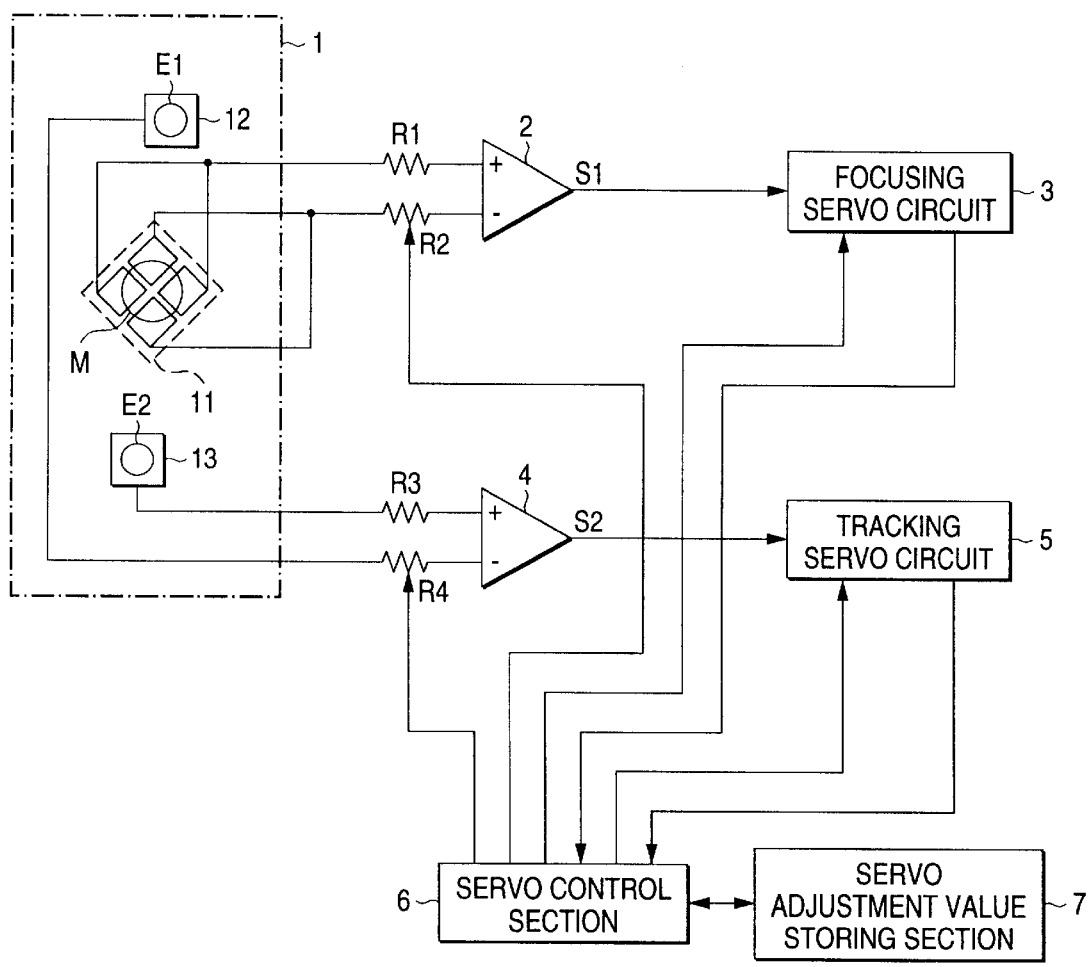
FIG. 1 is a block diagram showing the arrangement of the reproduced signal system of an optical disk reproducing device having a servo automatic adjustment function according to the invention.

An embodiment of this invention will be described with reference to the accompanying drawings.

FIG. 1 is a block diagram showing the arrangement of the reproduced signal system of an optical disk reproducing device with a servo automatic adjustment function according to the embodiment.

In the embodiment, an optical pick-up 1 for reading signals from a multi-layer optical disk (not shown) is formed by a 3-spot method that a beam is divided into three parts by a diffraction grating.

That is, three light beams form three spots (a main beam M, and servo beams E1 and E2) on the pit surface of each layer of the optical disk. The beams M, E1 and E2 reflected from the pit surface are received by light receiving elements (or photodiodes) 11, 12 and 13, respectively.

The light receiving element 11 receiving the reflected beam of the main beam M is made up, for instance, of a four-divided photodiode. The output terminals of the four-divided photodiode are connected respectively through a resistor R1 and a variable resistor R2 to the input terminals of a differential amplifier 2. The output of the amplifier 2 is applied, as a focus error signal S1, to a focusing servo circuit 3.

On the other hand, the output terminals of the light receiving elements (photodiodes) 12 and 13 receiving the reflected beams of the servo beams E1 and E2 are connected respectively through a resistor R3 and a variable resistor R4 to the input terminals of a differential amplifier 4. The output of the amplifier 4 is applied, as a tracking error signal S2, to a tracking servo circuit 5.

The focusing servo circuit 3 comprises a compensation amplifier, a power amplifier, a lock detector, an objective lens, a focus motor for driving the objective lens, and a lead-in circuit (not shown). The tracking servo circuit 5 comprises a compensation amplifier, a power amplifier, a jump pulse generator, a tracking mirror, a slider motor, and a scan voltage generator (not shown). The focusing servo circuit 3 and the tracking servo circuit 5 are conventional ones. Therefore, the detailed description of those circuits 3 and 5 will be omitted here.

A servo control section 6, which controls the focusing servo circuit 3 and the tracking servo circuit 5, performs control to vary the resistance values of the variable resistors R2 and R4. In addition, the servo control section 6 receives various signals directly from the focusing servo circuit 3 which are necessary for focusing servo adjustment, and receives various signals directly from the tracking servo circuit 5 which are necessary for tracking servo adjustment. Furthermore, the servo control section 6 stores various servo adjustment values in a servo adjustment value storing section 7 which are provided when the servo automatic adjustment mode is performed.

The automatic adjustment mode, which is performed when a double-layer optical disk is loaded in the above-described optical disk reproducing device, will be described with reference to the flow chart of FIG. 2. This automatic adjustment mode is performed after the optical disk is loaded and before the reproduction operation is started.

That is, when the double-layer optical disk is loaded in the device and the power switch is turned on, the servo control section 6 performs the automatic adjustment mode for each recording layer. That is, first the reproduction of the first layer is started, and for satisfactory reproduction the focusing servo and tracking servo offset, gain and balance adjustment (i.e., servo adjustment) is carried out (Step S1), and the resultant servo adjustment values are measured and stored in the servo adjustment value storing section 7 (Step S2).

For instance, the focusing servo balance adjustment will be described. If, when the optical pick-up 1 is moved radially outwardly, the servo beams E1 and E2 applied to the track pit line are equal to each other in quantity of light, then the waveform of the focus error signal S1 which is received by the light receiving elements 12 and 13, and amplified by the differential amplifier 4 is a sinusoidal wave whose positive and negative amplitudes are equal to each other; however, if not equal to each other in quantity of light, the positive and negative amplitudes of the waveform are not equal to each other. Therefore, the servo control section 6, while varying the variable resistor R2, performs adjustment so that the positive and negative amplitudes of the focus error signal S1 are equal to each other, and stores the resistance value of the variable resistor R2 obtained when the positive and negative amplitudes of the focus error signal S1 become equal to each other, as the first layer focusing servo balance adjustment value, in the servo adjustment value storing section 7. The servo automatic adjustment itself is well known in the art, and therefore the detailed description of the other servo adjustments will be omitted here. In addition, a focus offset voltage value, a focus amplifier gain value, a focus amplifier frequency characteristic value (equalizer constant), a tracking offset voltage value, a tracking amplifier gain value, a tracking amplifier frequency characteristic value (equalizer constant), an RF amplifier gain value, or an RF amplifier frequency characteristic value (equalizer constant) may be stored for each layer in the servo adjustment value storing section 7.

In the servo control section 6, such an automatic adjustment mode is carried out to achieve the first layer servo adjustment, and the servo adjustment values are stored in the servo adjustment value storing section 7.

After the achievement of the first layer servo adjustment, the servo control section 6 starts the second layer reproduction, and for the purpose of satisfactory reproduction, carries out the focusing servo and tracking servo offset, gain and balance servo adjustment (Step S3), and the resultant servo adjustment values are measured and stored in the servo adjustment value storing section 7 (Step S4). Thus, the servo adjustment values provided for the purpose of satisfactorily performing the servo of each layer of the loaded optical disk are stored for each layer in the servo adjustment value storing section 7. The servo control section 6, after storing the servo adjustment values of each layer of the optical disk in the servo adjustment value storing section 7, ends the automatic adjustment mode.

Next, the reproduction operation of the loaded optical disk will be described with reference to the flow chart of FIG. 3.

When an operation button (not shown) is operated to select the reproduction of the optical disk, the servo control section 6 determines whether the recording layer of the optical disk to be reproduced is the first layer or whether it is the second layer (Step S11). In the case where it is the first layer, the servo adjustment values for the first layer are read out of the servo adjustment value storing section 7 (Step S12). Then, to reach the servo adjustment values thus read out, the variable resistors R2 and R4 and the servo values of the focusing servo circuit 3 and the tracking servo circuit 5 are adjusted (Step S14). Under this condition, the reproducing operation of the first layer is quickly started (Step S15).

On the other hand, when, during the reproduction of the first layer, the user operates an operation button to select the reproduction of the second layer, the servo control section 6 reads the servo adjustment values for the second layer from the servo adjustment value storing section 7 (Step S13), and in order to reach the servo adjustment values thus read, adjusts the variable resistors R2 and R4, and the servo values of the focusing servo circuit 3 and the tracking servo circuit 5 (Step S14). Under this condition, the reproducing operation of the second layer is started quickly (Step S15). That is, even if the first layer is switched over to the second layer, at that time instant the servo control section 6 will not perform the automatic adjustment mode again; that is, the servo control section 6 sets the servo adjustment values to those of the second layer read out of the servo adjustment value storing section 7, so that the reproducing operation of the second layer is quickly started. The same thing may be applied also in the case where the user operates the operation button to switch the reproduction of the second layer over to the reproduction of the first layer.

In the above-described embodiment, the optical disk is of double-layer structure; however, it goes without saying that the technical concept of the invention is applicable also to an optical disk which is of more than double-layer structure.

Furthermore, the above-described embodiment employs the multi-layer optical disk; however, the invention is not limited thereto or thereby. That is, the technical concept of the invention is applicable also to a piezoelectric disk, an electric capacity disk, or the like.

As was described above, the multi-layer recording medium reproducing device having an automatic adjustment mode of automatically performing servo adjustment to reproduce a multi-layer recording medium, comprises: the storing section which, during the automatic adjustment mode, performs the servo adjustment of each of the recording layers of the multi-layer recording medium, respectively, for predetermined periods of time, and stores the resultant service adjustment values respectively for the recording layers; and the servo adjustment control section which, during reproduction of the multi-layer recording medium, reads from the storing section a servo adjustment value corresponding to a recording layer to be reproduced, and performs servo adjustment to reach the servo adjustment value thus read. Therefore, it is unnecessary to perform the automatic adjustment mode whenever one recording layer to be reproduced is switched to another one; that is, the time required for switching one recording layer to another recording layer is reduced. In other words, when the layer switching operation is carried out, the soundless period is extremely short. Therefore, for the user, the reproduction state is satisfactory at all times.

Furthermore, the multi-layer recording medium reproducing device, after the multi-layer recording medium has been loaded, and before the reproducing operation is started, stores in the storing section a servo adjustment value of each of the recording layers. Hence, in the reproduction operation thereafter, the recording layer switching operation can be achieved smoothly.

What is claimed is:

1. A multi-layer recording medium reproducing device having an automatic adjustment mode of automatically performing servo adjustment to reproduce a multi-layer recording medium, said device comprising:

a storing section which, during the automatic adjustment mode, performs the servo adjustment of recording layers of the multi-layer recording medium respectively for predetermined periods of time, and stores the resultant servo adjustment values respectively for the recording layers, the servo adjustment values including offset, gain and balance;

a stage of differential amplifiers;

a servo adjustment control section which, during a reproduction of the multi-layer recording medium, reads from said storing section the offset, gain and balance servo adjustment values corresponding to one of the recording layers to be reproduced, and performs the servo adjustment to a first motor of a focus servo circuit and to a second motor of a tracking servo circuit to reach the offset and gain servo adjustment values thus read and outputs the balance servo adjustment value to the stage of differential amplifiers, wherein the servo adjustment control section also receives signals directly from the focus and tracking servo circuits during the servo adjustment; and an optical pickup that includes a plurality of photo-receiving elements, wherein the stage of differential amplifiers amplifies, based upon the balance servo adjustment value, output received from a first set of the plurality of photo-receiving elements to provide input to the tracking servo circuit and output received from a second set of the plurality of photo-receiving elements to provide input to the focusing servo circuit.

2. The multi-layer recording medium reproducing device as claimed in claim 1, wherein after the multi-layer recording medium has been loaded and before a reproducing operation is started, the automatic adjustment mode for storing in said storing section the servo adjustment values for the recording layers is performed.

3. The multi-layer recording medium reproducing device as claimed in claim 1, wherein the multi-layer recording medium is a multi-layer optical disk.

* * * * *